(12) United States Patent
Camp et al.

(10) Patent No.: US 9,940,034 B2
(45) Date of Patent: Apr. 10, 2018

(54) REDUCING READ ACCESS LATENCY BY STRADDLING PAGES ACROSS NON-VOLATILE MEMORY CHANNELS

(71) Applicant: International Business Machines Corporation, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Thomas Parnell, Zurich (CH); Roman Pletka, Uster (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/005,460

(22) Filed: Jan. 25, 2016

(65) Prior Publication Data

US 2017/0212692 A1   Jul. 27, 2017

(51) Int. Cl.
G06F 3/06 (2006.01)
G06F 12/02 (2006.01)
G06F 12/1009 (2016.01)

(52) U.S. Cl.
CPC .......... *G06F 3/0611* (2013.01); *G06F 3/0644* (2013.01); *G06F 3/0664* (2013.01); *G06F 3/0688* (2013.01); *G06F 12/0246* (2013.01); *G06F 12/0253* (2013.01); *G06F 12/1009* (2013.01); *G06F 2212/152* (2013.01); *G06F 2212/2022* (2013.01); *G06F 2212/7201* (2013.01); *G06F 2212/7205* (2013.01)

(58) Field of Classification Search
CPC ...... G06F 3/0611; G06F 3/064; G06F 3/0688; G06F 12/0246; G06F 12/1009; G06F 2212/2022; G06F 2212/7201
See application file for complete search history.

(56) References Cited

U.S. PATENT DOCUMENTS

| | | | |
|---|---|---|---|
| 7,814,262 B2 | 10/2010 | Sinclair | |
| 8,364,929 B2 | 1/2013 | Haines et al. | |
| 8,626,989 B2 | 1/2014 | Van Aken | |
| 8,724,381 B2 | 5/2014 | Burger, Jr. et al. | |

(Continued)

OTHER PUBLICATIONS

Bai, Shi et al., "A Parallel Flash Translation Layer Based on Page Group-Block Hybrid-Mapping Method", IEEE, IEEE Transactions on Consumer Electronics, vol. 58, No. 2, May 2012, pp. 441-449.

*Primary Examiner* — Hal Schnee
(74) *Attorney, Agent, or Firm* — Stephen R. Tkacs; Stephen J. Walder, Jr.; Randall J. Bluestone (57) ABSTRACT

A mechanism is provided in a non-volatile memory controller for reducing read access latency by straddling pages across non-volatile memory channels. Responsive to a request to write a logical page to a non-volatile memory array, the non-volatile memory controller determines whether the logical page fits into a current physical page. Responsive to determining the logical page does not fit into the current physical page, the non-volatile memory controller writes a first portion of the logical page to a first physical page in a first block and writes a second portion of the logical page to a second physical page in a second block. The first physical page and the second physical page are on different non-volatile memory channels.

15 Claims, 7 Drawing Sheets

(56) References Cited

U.S. PATENT DOCUMENTS

| | | |
|---|---|---|
| 9,026,887 B2 | 5/2015 | Manning et al. |
| 2013/0246892 A1* | 9/2013 | Au .................... G06F 11/1008 |
| | | 714/773 |
| 2014/0101369 A1 | 4/2014 | Tomlin et al. |
| 2014/0156966 A1* | 6/2014 | Ellis ..................... G06F 3/064 |
| | | 711/173 |
| 2014/0208061 A1* | 7/2014 | Cohen ................ G06F 12/0246 |
| | | 711/206 |
| 2014/0325117 A1* | 10/2014 | Canepa ............... G06F 12/0246 |
| | | 711/103 |

* cited by examiner

REDUCING READ ACCESS LATENCY BY STRADDLING PAGES ACROSS NON-VOLATILE MEMORY CHANNELS

BACKGROUND

The present application relates generally to an improved data processing apparatus and method and more specifically to mechanisms for reducing read access latency by straddling pages across non-volatile memory channels.

Flash memory is an electronic non-volatile computer storage medium that can be electrically erased and reprogrammed. Flash memory was developed from electrically erasable programmable read-only memory (EEPROM). There are two main types of flash memory, which are named after the NAND and NOR logic gates. The individual flash memory cells exhibit internal characteristics similar to those of the corresponding gates. Whereas EEPROMs had to be completely erased before being rewritten, NAND type flash memory may be written and read in pages and erased in blocks which are generally much smaller than the entire device. NOR type flash allows a single machine word (byte) to be written—to an erased location—or read independently. The NAND type is primarily used in memory cards, USB flash drives, solid-state drives, and similar products, for general storage and transfer of data. NAND or NOR flash memory is also often used to store configuration data in numerous digital products, a task previously made possible by EEPROM or battery-powered static random access memory (RAM).

Example applications of both types of flash memory include personal computers, PDAs, digital audio players, digital cameras, mobile phones, synthesizers, video games, scientific instrumentation, industrial robotics, medical electronics, and so on. In addition to being non-volatile, flash memory offers fast read access times, as fast as dynamic RAM, although not as fast as static RAM or ROM. Its mechanical shock resistance helps explain its popularity over hard disks in portable devices, as does its high durability, being able to withstand high pressure, temperature, etc.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a non-volatile memory controller, is provided for reducing read access latency by straddling pages across memory channels. The method comprising determining whether the logical page fits into a current physical page responsive to a request to write a logical page to a non-volatile memory array. The method further comprises, and responsive to determining the logical page does not fit into the current physical page, writing a first portion of the logical page to a first physical page in a first block and writing a second portion of the logical page to a second physical page in a second block. The first physical page and the second physical page are on different memory channels.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Non-volatile memory arrays are able to provide extremely low access latency of random reads, in the order of 100 microseconds. This low latency is extremely valuable to the enterprise users of the arrays, because such low latency reduces the transaction time and therefore improves the resulting cost-effectiveness of the storage solution compared to the alternatives. For various reasons, for example due to bytes added to each logical (user) page for ECC code or for other data correction checks, or due to compression or other data reduction schemes, the logical (user) page may not align with the physical container that stores logical pages on the non-volatile memory media. In order to improve the effective usage of non-volatile memory media storage in this case of non-aligned logical pages, a single logical page may straddle (span) across two physical pages. Typically, the two physical pages are contained in a single physical block so they have to be read sequentially. As the two physical pages holding a straddled page are consecutive in the same physical block performing a read operation for such a logical page is straight forward and does not require any additional information. This however results in reading a straddling logical page with double the latency.

In a conventional approach, a logical page may straddle two physical pages (containers) within a single physical block. The two physical pages have to be read sequentially, resulting in double the latency for straddling pages. Although this approach is acceptable from the perspective of the implementation complexity and the resulting latency, it results in a higher and less predictable read latency. Due to this, it is highly desirable to avoid this behavior. In other words, it is highly desirable to have the same (low) read latency both for straddling and non-straddling pages.

The illustrative embodiments provide a mechanism that allows straddling of a logical page across physical blocks on different memory channels, thus allowing parallel reads of both parts of the logical page. Therefore, we eliminate the difference in the read latency between the straddling and the non-straddling pages.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
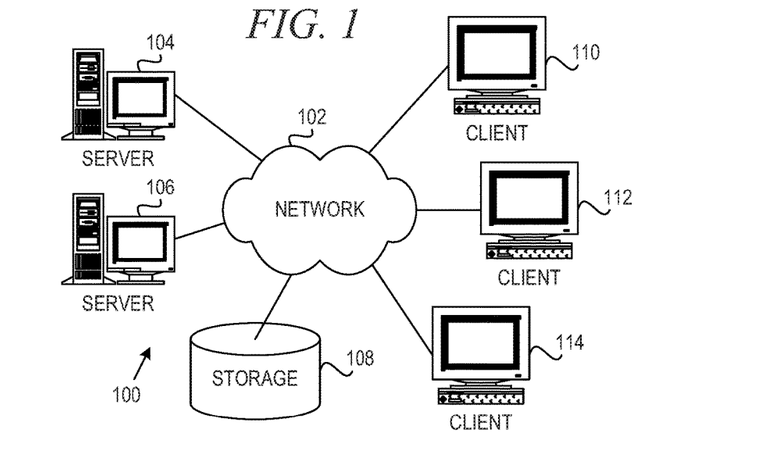
FIG. 1 is an example diagram of a distributed data processing system in which aspects of the illustrative embodiments may be implemented.
Figure 2:
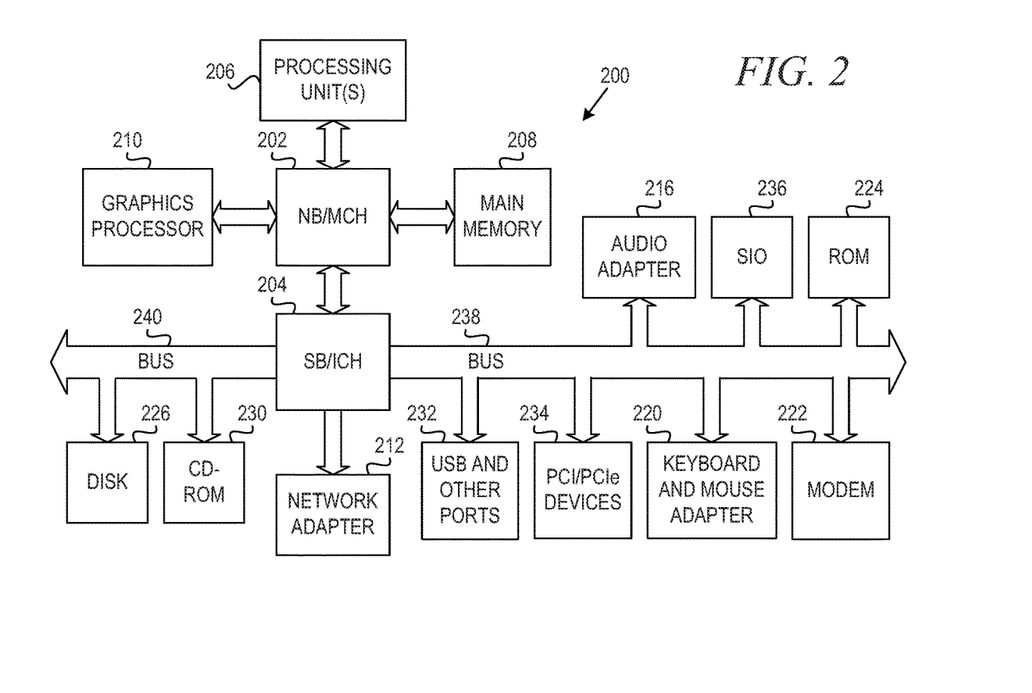
FIG. 2 is an example block diagram of a computing device in which aspects of the illustrative embodiments may be implemented.
Figure 3:
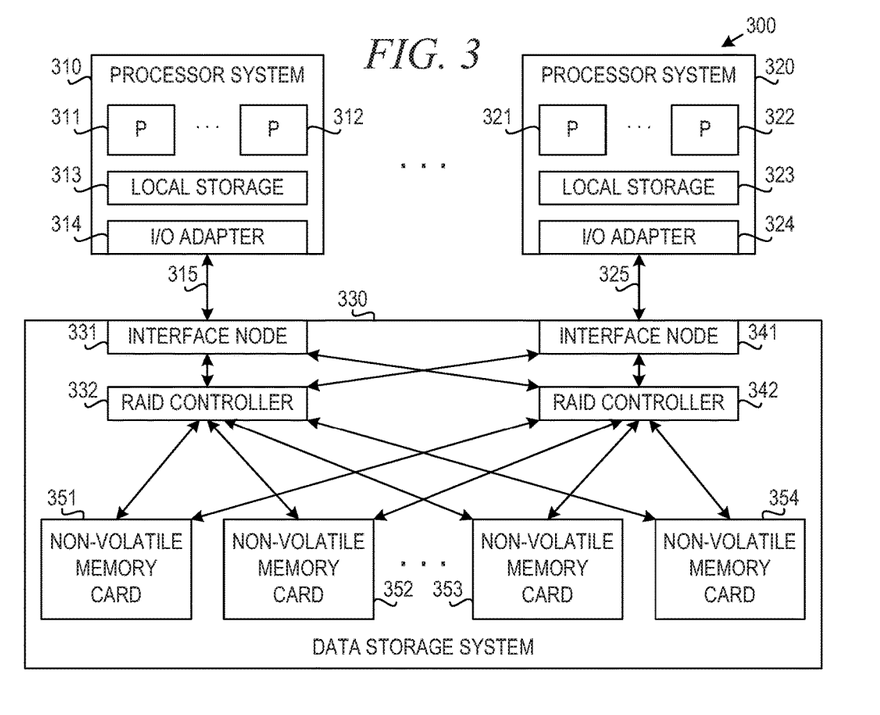
FIG. 3 illustrates a high level block diagram of an exemplary distributed data processing system in accordance with an illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, or data storage systems 108 may be specifically configured to implement a non-volatile memory controller that reduces read access latency by straddling pages across memory channels. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates straddling logical pages across memory channels.

As noted above, the mechanisms of the illustrative embodiments utilize specifically configured computing devices, or data processing systems, to perform the operations for reducing read access latencies by straddling pages across memory pages. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through a peripheral component interconnect express (PCIe) port.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to providing a non-volatile memory controller that reduces read access latency by straddling pages across memory channels.

Those of ordinary skill in the art will appreciate that the hardware in FIGS. 1 and 2 may vary depending on the implementation. Other internal hardware or peripheral devices, such as non-volatile memory, equivalent non-volatile memory, or optical disk drives and the like, may be used in addition to or in place of the hardware depicted in FIGS. 1 and 2. Also, the processes of the illustrative embodiments may be applied to a more generic multiprocessor data processing system, other than the SMP system mentioned previously, for example to a heterogeneous multiprocessor system, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with non-volatile memory to provide non-volatile memory for storing operating system files and/or user-generated data, for example. Essentially, data processing system 200 may be any known or later developed data processing system without architectural limitation.

FIG. 3 illustrates a high level block diagram of an exemplary distributed data processing system in accordance with an illustrative embodiment. Distributed data processing system 300 includes a data storage system 330 having a non-volatile memory array as described further herein. As shown, distributed data processing system 300 includes one or more hosts, such as a processor system 310 having one or more processors 311, 312 that process instructions and data or processor system 320 having one or more processors 321, 322. Processor systems 310, 320 may additionally include local storage 313, 323 (e.g., dynamic random access memory (DRAM) or disks) that may store program code, operands, and/or execution results of the processing performed by processors 311, 312, 321, 322. In various embodiments, processor systems 310, 320 can be, for example, mobile computing devices (such as a smartphones or tablets), laptops, or desktop personal computer systems, server computer systems (such as one of the POWER® series available from International Business Machines Corporation), or mainframe computer systems. Processor systems 310, 320 can also be embedded processor systems using various processors such as ARM®, Powers®, Intel® X86, or any other processor combined with memory caches, memory controllers, local storage, I/O bus hubs, etc.

Each processor system 310, 320 further includes an input/output (I/O) adapter 314, 324 that is coupled directly (i.e., without any intervening device) or indirectly (i.e., through at least one intermediate device) to a data storage system 330 via an I/O channel 315, 325. In various embodiments, I/O channel 315, 325 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 315, 325 include read IOPs by which a processor system 310, 320 requests data from data storage system 330 and write IOPs by which processor system 310, 320 requests storage of data in data storage system 330.

In the illustrated embodiment, data storage system 330 includes multiple interface nodes 331, 341 through which data storage system 330 receives and responds to input/output operations (IOP) via I/O channels 315, 325. Each interface node 331, 341 is coupled to each of multiple Redundant Array of Independent Disks (RAID) controllers 332, 342 in order to facilitate fault tolerance and load balancing. For example, RAID controllers 332, 342 may implement one or more levels of RAID, including nested RAID (e.g., RAID 50 or RAID 60), across non-volatile memory cards 351, 352, 353, 354. Each of RAID controllers 332, 342 is in turn coupled (e.g., by a PCIe bus) to each of multiple non-volatile memory cards 351-354 including, in one example, NAND flash storage media. In other embodiments, other or additional lossy storage media can be employed.

Figure 4:
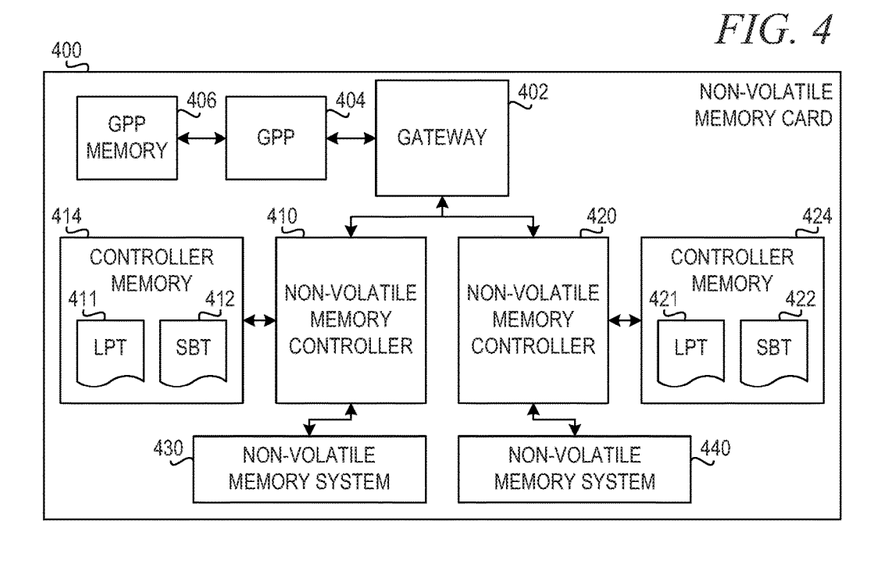
FIG. 4 depicts a more detailed block diagram of a non-volatile memory card in accordance with an illustrative embodiment.

FIG. 4 depicts a more detailed block diagram of a non-volatile memory card in accordance with an illustrative embodiment. FIG. 4 may be a non-volatile memory card 400 of data storage system 330 of FIG. 3. Non-volatile memory card 400 includes gateway 402 that serves as an interface between non-volatile memory card 400 and RAID controllers 332, 342. Gateway 402 is coupled to a general-purpose processor (GPP) 404, which can be configured (e.g., by program code) to perform various management functions, such as pre-processing of IOPs received by gateway 402 and/or to schedule servicing of the IOPs by non-volatile memory card 400. GPP 404 is coupled to GPP memory 406 (e.g., Dynamic Random Access Memory (DRAM) or Magneto-resistive Random Access Memory (MRAM)) that can conveniently buffer data created, referenced, and/or modified by GPP 404 in the course of its processing.

Gateway 402 is further coupled to multiple non-volatile memory controllers 410, 420, each of which controls a respective non-volatile memory system 430, 440. Non-volatile memory controllers 410, 420 can be implemented, for example, by an Application Specific Integrated Circuit (ASIC) or Field-Programmable Gate Array (FPGA) having an associated controller memory 414, 424 (e.g., DRAM). In embodiments in which non-volatile memory controllers 410, 420 are implemented with FPGAs, GPP 404 may program and configure non-volatile memory controllers 410, 420 during start-up of data storage system 330. After startup, in general operation, non-volatile memory controllers 410, 420 receive read and write IOPs from gateway 402 that request to read data stored in non-volatile memory systems 430, 440 and/or to store data in non-volatile memory system 430, 440. Non-volatile memory controllers 410, 420 service these IOPs, for example, by accessing non-volatile memory systems 430, 440 to read or write the requested data from or into non-volatile memory systems 430, 440 or by accessing one or more read and/or write caches (not shown) associated with non-volatile memory systems 430, 440.

In one example embodiment, non-volatile memory controllers 410, 420 implement a flash translation layer (FTL) that provides logical-to-physical address translation to enable access to specific memory locations within non-volatile memory systems 430, 440. In general, an IOP received by non-volatile memory controller 410, 420 from a host device, such as a processor system 310 in FIG. 3, contains the logical block address (LBA) at which the data is to be accessed (read or written) and, if a write IOP, the write data to be written to data storage system 330. The IOP may also specify the amount (or size) of the data to be accessed. Other information may also be communicated depending on the protocol and features supported by data storage system 330. As is known to those skilled in the art, NAND flash memory, such as that employed in non-volatile memory systems 430, 440 in one example embodiment, is constrained by its construction such that the smallest granule of data that can be accessed by a read or write IOP is fixed at the size of a single physical page of flash memory, for example, 16 kilobytes (kB). The LBA provided by the host device corresponds to a logical page within a logical address space, the page typically having a size of 4 kilobytes. Therefore, more than one logical page may be stored in a physical flash page. The flash translation layer translates this LBA into a physical address assigned to a corresponding physical location in a non-volatile memory system 430, 440.

Non-volatile memory controllers 410, 420 may perform address translation and/or store mappings between logical and physical addresses in a logical-to-physical translation data structure, such as a logical-to-physical translation table (LPT) 411, 421, which may conveniently be stored in controller memory 414, 424. Controller memory 414, 424 also includes a Straddle Block Table (SBT) 412, 422. One of SBTs 412, 422 is updated when a block stripe gets created or dissolved. From the entry in the SBT 412, 422, non-volatile memory controller 410, 420 obtains the block index of a block on a different channel to which data can straddle in a page stripe.

In addition, although embodiments are described that include use of a NAND flash memory, it should be appreciated that embodiments of the present invention can also be used with other types of non-volatile random access memory (NVRAM) including, for example, phase-change memory (PCM), magnetoresistive RAM (MRAM) or combinations thereof.

Figure 5:
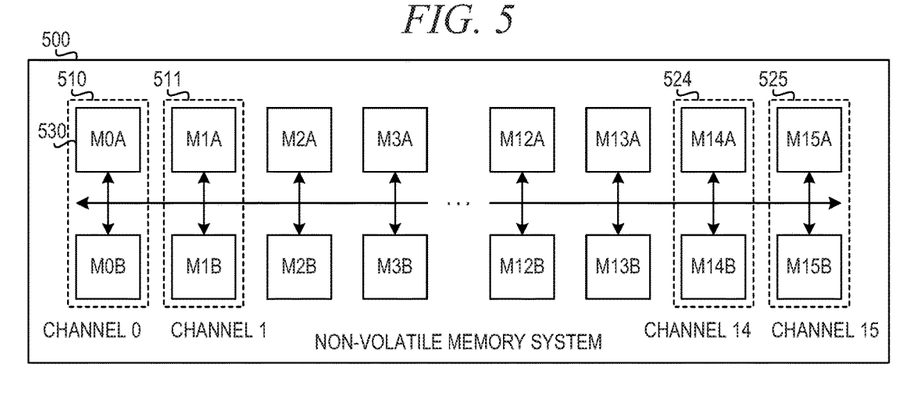
FIG. 5 is a block diagram illustrating a non-volatile memory system in accordance with an illustrative embodiment.

FIG. 5 is a block diagram illustrating a non-volatile memory system in accordance with an illustrative embodiment. The non-volatile memory system 500 may be, for example, non-volatile memory system 430, 440 in FIG. 4. As shown in FIG. 5, non-volatile memory system 500 may be formed from thirty-two (32) individually addressable non-volatile memory storage devices 530, which may be NAND flash memory devices, for example. In the illustrated example, each of the non-volatile memory storage devices M0A-M15B takes the form of a board-mounted non-volatile memory module capable of storing one or more bits per cell. Thus, non-volatile memory modules may be implemented with Single Level Cell (SLC), Multi-Level Cell (MLC), Three Level Cell (TLC), or Quad Level Cell (QLC) memory. The thirty-two non-volatile memory modules are arranged in sixteen groups of two, (M0A, M0B) through (M15A, M15B). For purposes of the physical addressing scheme, each group of two modules forms a channel, 510, 511, 524, 525 such that non-volatile memory system 500 includes sixteen channels (Channel 0 510 to Channel 15 525).

In one embodiment, each of the individual lanes has a respective associated bus coupling it to the associated non-volatile memory controller 410, 420. Thus, by directing its communications to one of the specific communication buses, non-volatile memory controller 410, 420 can direct its communications to one of the channels of the non-volatile memory modules. Because each communication bus for a given lane is independent of the communication buses for the other channels, a non-volatile memory controller 410, 420 can issue commands and send or receive data across the various communication buses at the same time, enabling the non-volatile memory controller 410, 420 to access the non-volatile memory modules corresponding to the individual channels at, or very nearly at, the same time.

Figure 6:
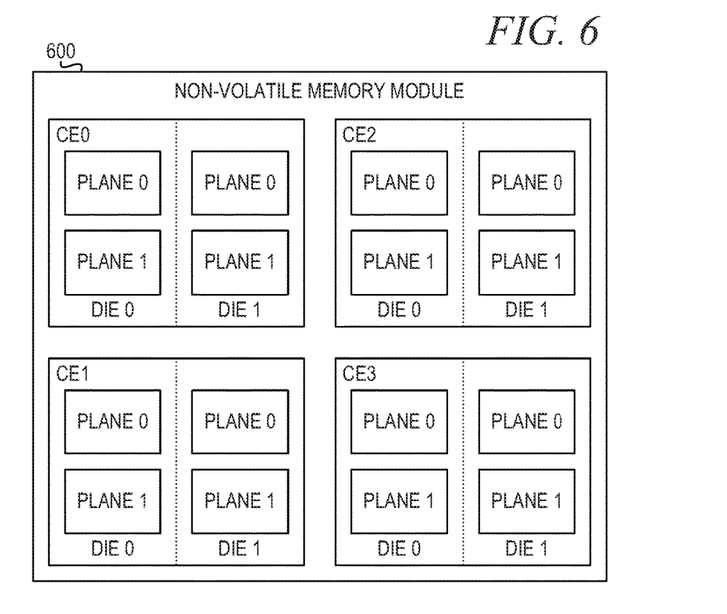
FIG. 6 illustrates a non-volatile memory module in accordance with an illustrative embodiment.

FIG. 6 illustrates a non-volatile memory module in accordance with an illustrative embodiment. Non-volatile memory module 600 can be utilized to implement any of non-volatile memory modules M0A-M15B 530 of FIG. 5. As shown in FIG. 6, the physical storage locations provided by non-volatile memory module 600 are further subdivided into physical locations that can be addressed and/or identified through Chip Enables (CEs). In the example of FIG. 6, the physical memory of each non-volatile memory module 600 is divided into four Chip Enables (CE0, CE1, CE2 and CE3), each having a respective CE line that is asserted by non-volatile controller 410, 420 to enable access to or from the physical memory locations within the corresponding CE. Each CE is in turn subdivided into multiple dice (e.g., Die 0 and Die 1) each having two planes (e.g., Plane 0 and Plane 1). Each plane represents a collection of blocks (described below) that, because of the physical layout of the non-volatile memory modules, are physically associated with one another and that utilize common circuitry (e.g., I/O buffers) for the performance of various operations, such as read and write operations.

Non-volatile memory controllers typically group blocks from different channels together to build a so-called block stripe. This is mainly done to improve parallelism in the system, hence the controller can write the memory pages on all channels in parallel, but also to add parity information in case one of the blocks in the stripe becomes unreadable. The addition of the parity information affects the garbage collection activities, effectively making a block stripe a minimal erasure unit. Therefore, a block stripe is often also called a logical erase block (LEB) because garbage collection process must select an entire block stripe for relocation, even though a physical erase unit is a single block (a subset of an LEB). Upon selecting a block stripes (an LEB) for relocation, the garbage collection process will relocate all valid pages from the block stripe before the blocks from the stripe can be erased and the space from these blocks can be reused.

Figure 7:
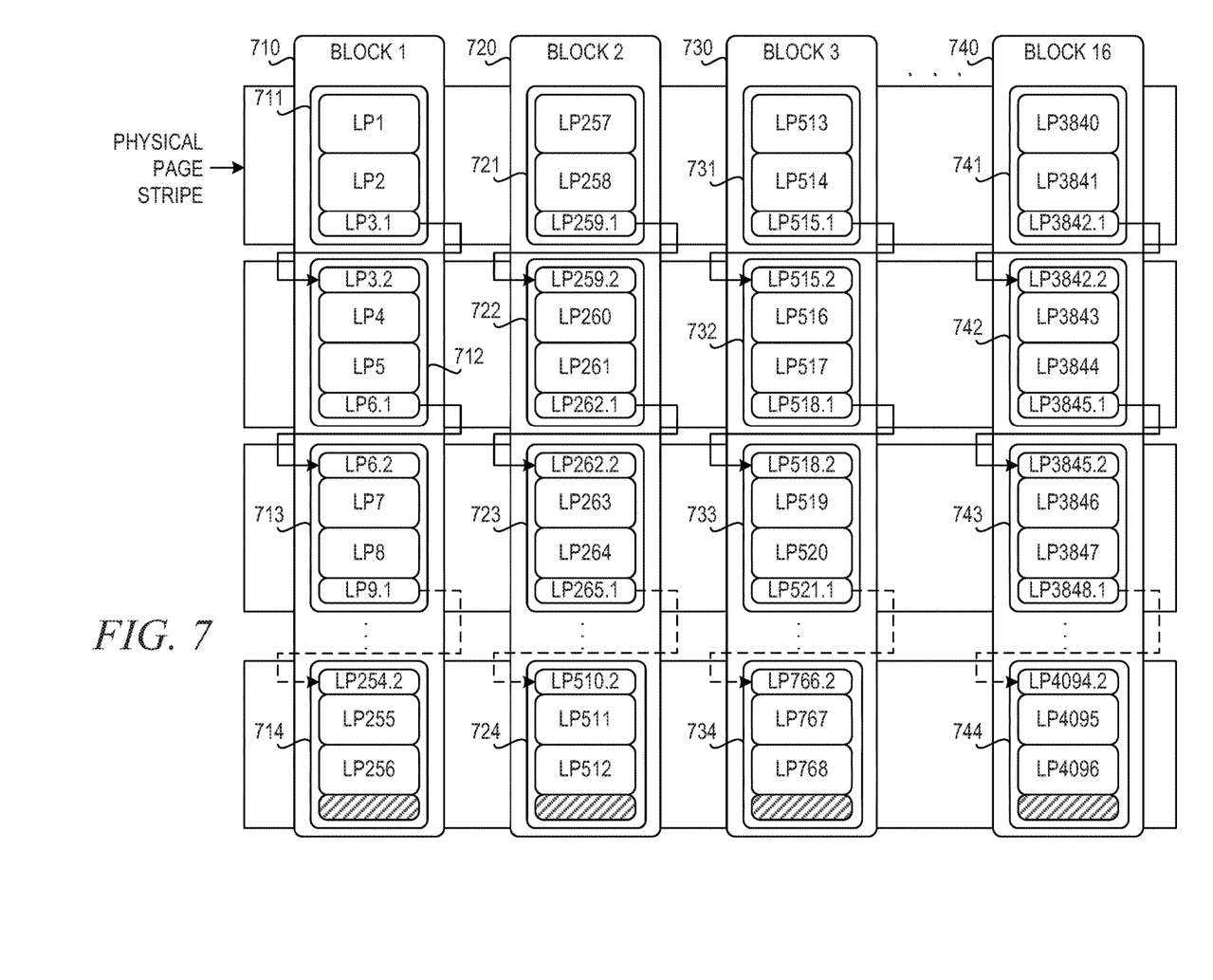
FIG. 7 illustrates an example of an approach where a logical page straddles within a single physical block.

FIG. 7 illustrates an example of an approach where a logical page straddles within a single physical block. It is implicitly known where a second part of a logical page is located, namely the following physical page of the same block. This also means that one cannot straddle a page out from the last page of a block. If a page does not fit into the last page of the block, this space is wasted (left unused).

As shown in the example depicted in FIG. 7, the non-volatile memory comprises block 1 710, block 2 720, block 3 730, . . . , and block 16 740. Each physical block 710-740 is on a different channel and may have a different index in that channel. Block 1 710 comprises physical pages (containers) 711, 712, 713, . . . 714; block 2 720 comprises physical pages 721, 722, 723, . . . , 724; block 3 730 comprises physical pages 731, 732, 733, . . . , 734; and, block 16 740 comprises physical pages 741, 742, 743, . . . , 744. The block stripe table maintained by GPP 404 in the GPP memory 406 (described above with reference to FIG. 4) keeps track of which block indexes from each channel belong to each block stripe.

As shown in the depicted example, logical pages LP1, LP2 are stored in physical page or container 711. There is not enough space to store logical page LP3; therefore, logical page LP3 straddles physical page 711 and physical page 712 in block 1 710. Similarly, there is not enough space to store logical page LP6; therefore, logical page LP6 straddles physical page 712 and physical page 713. If there is not enough space to store another logical page in physical page 714, then the remaining space is wasted.

In the example shown in FIG. 7, the non-volatile memory controller can read 16 physical pages in parallel, one from each channel. The pages need not be in the same physical page stripe. Typically, read operations only read data pages holding the requested data, not the entire page stripe. This is done to reduce the number of reads. However, read operations from different read requests may be served from different channels in parallel of course. The non-volatile memory controller may perform a read access to read physical page 711, which contains logical pages LP1, LP2, and a portion of LP3 (LP3.1) in the same physical page stripe read. In order to read logical page LP3, the non-volatile memory controller performs sequential read accesses of physical page 711 and physical page 712 in separate physical page reads. The non-volatile memory controller then extracts the parts of LP3 (LP3.1 and LP3.2), transfers the parts of the logical page LP3 to dynamic random access memory, and coalesces the parts (LP3.1 and LP3.2) to form logical page LP3, which will be eventually returned to the user. As the second read access can only be started once the first read access has completed, overall latency is significantly larger compared to the case where the entire logical page is stored in a single physical page. Further, the two physical pages 711 and 712 holding straddled logical page LP3 are consecutive in the same physical block and performing a read operation for LP3 is hence straight forward. No additional information is required by non-volatile memory controller 410, 420 for the read operation.

Figure 8:
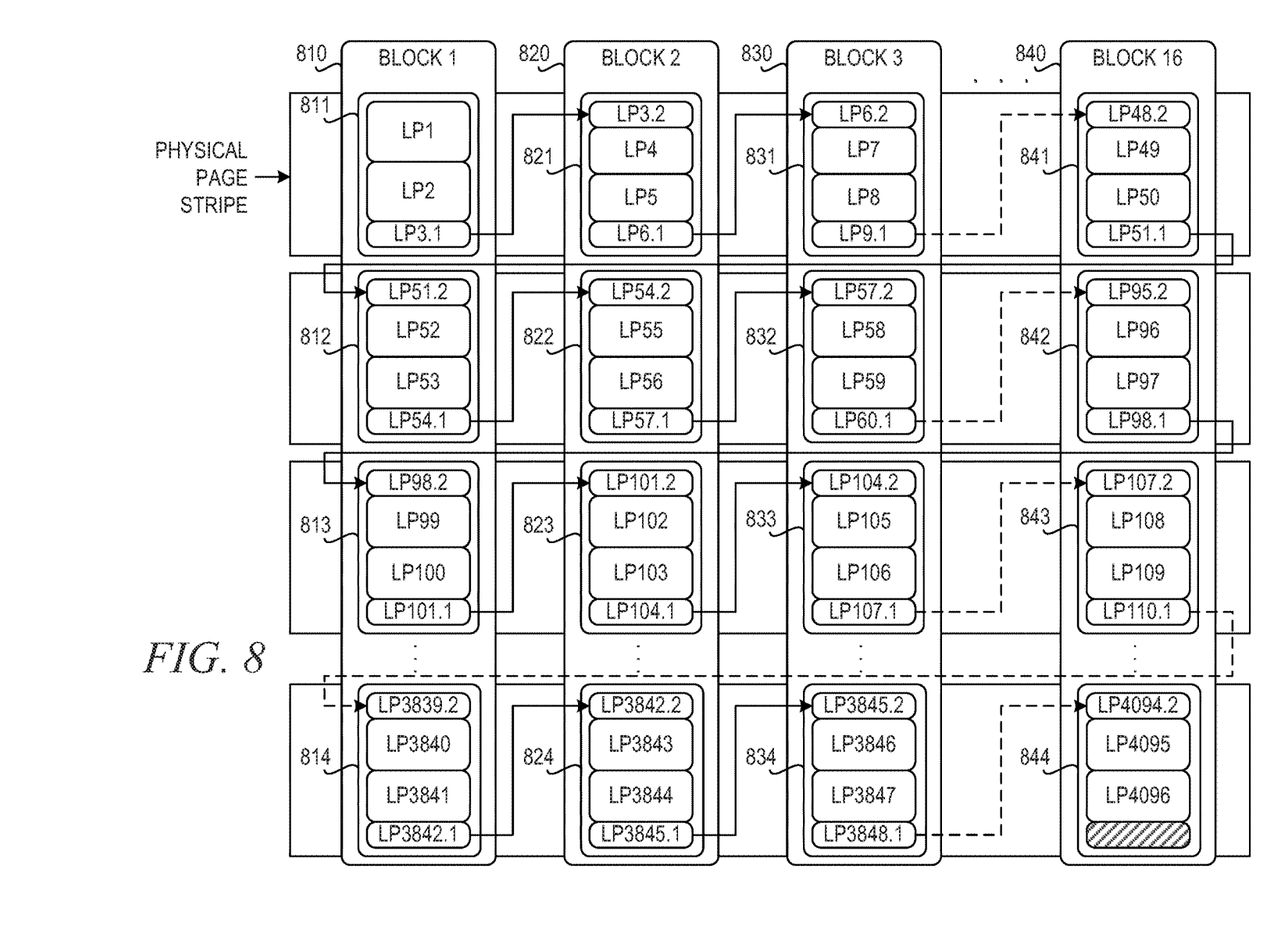
FIG. 8 illustrates an example of an approach where a logical page straddles memory channels in accordance with an illustrative embodiment.

FIG. 8 illustrates an example of an approach where a logical page straddles memory channels in accordance with an illustrative embodiment. As shown in the example depicted in FIG. 8, the non-volatile memory comprises block 1 810, block 2 820, block 3 830, . . . , and block 16 840. Each physical block 810-840 is on a different channel and may have a different index in that channel. Block 1 810 comprises physical pages (containers) 811, 812, 813, . . . 814; block 2 820 comprises physical pages 821, 822, 823, . . . , 824; block 3 830 comprises physical pages 831, 832, 833, . . . , 834; and, block 16 840 comprises physical pages 841, 842, 843, . . . , 844.

As shown in the depicted example, logical pages LP1, LP2 are stored in physical page or container 811. There is not enough space to store logical page LP3; therefore, logical page LP3 straddles physical page 811 in block 1 810 and physical page 821 in block 2 820. Similarly, there is not enough space to store logical page LP6 in physical page 820; therefore, logical page LP6 straddles physical page 821 in physical block 2 820 and physical page 831 in physical block 3 830. If there is not enough space to store another logical page (LP51) in physical page 841 in physical block 16, then logical page LP51 straddles from physical page 841 in physical block 16 840 to physical page 812 in physical block 1 810. Unlike the example shown in FIG. 7, here, additional information is required to perform a read operation of a straddled page: For example, when reading straddled logical page LP3, the page indexes of both physical pages 811 and 821 are implicitly known. However, the block index of the second part of the straddling logical page LP3.2 can be different from the block index of the block 810 but has to be known upon reading the second part LP3.2 of the straddle logical page LP3. In a naïve approach this information could be added to the logical-to-physical address mapping table (LPT) 411, 421 resulting in almost doubling the size of the table. Due to the restricted amount of controller memory 414 that can be attached to non-volatile memory controller 410, 420 this may however not be feasible or if done significantly reduce the storage capacity that can be managed by non-volatile memory controller 410, 420.

In another embodiment, data containers 811, 812, etc. can be smaller than the physical page. This may be due to the specific architectural requirements, for example due to using storage media with very large physical pages, or writing very small logical pages, or a combination therein. However, there is no conceptual difference in applying the mechanisms of the illustrative embodiments, regardless of whether data containers are smaller or equal to the physical page size.

In the case where a logical page may straddle across physical blocks, the non-volatile memory controller must access additional metadata that includes where a second part of a logical page can be found. This information is maintained for each block, instead of per logical page, which significantly reduces the amount of required metadata. Typically, there are hundreds of thousands up to a few millions of blocks per non-volatile memory controller, which results in up to a few megabytes of additional metadata per non-volatile memory controller.

This metadata is stored in a data structure of the non-volatile memory controller referred to herein as a Straddle Block Table (SBT) 412, 422. The SBT 412, 422 is updated when a block stripe gets created or dissolved. Note that the data structure is not updated upon regular reads or writes, whereas the Logical Page Table (LPT) 411, 421 entries are updated much more often—with every write. However, the SBT 412, 422 is consulted on every read of a straddling page. From the entry in the SBT 412, 422, non-volatile memory controller 410, 420 obtains the block index of a block on a different memory channel to which data can straddle in a page stripe. Although the SBT 412, 422 is a mapping table as the LPT 411, 421, the SBT 412, 422 is several orders of magnitude smaller than the LPT 411, 421—since mapping in the SBT 412, 422 is block-to-block, instead of page-to-page which is the mapping in the LPT 411, 421. Namely, the SBT 412, 422 maps physical block indexes on one channel to other physical block indexes on other channels whereas the LPT 411, 421 maps logical to physical pages.

Each physical block that holds valid data has an entry in the SBT 412, 422. The SBT table is indexed by the physical block index. To get the index of the physical block, non-volatile memory controller performs a simple arithmetic operation on the physical page address obtained from the LPT entry lookup. An example of such arithmetic operation can be to extract a subset of the bits of the physical page address.

Returning to FIG. 8, for each block 810-840, the non-volatile memory controller can find the block that holds the second part of a straddling logical page. In other words, the information stored in the SBT 412, 422 corresponds to the block stripe table maintained by firmware without stripe information and the other additional information. In other words, the SBT 412, 422 stores block stripe table information in a reorganized fashion such that non-volatile memory controller 410, 420 does not need the knowledge to which stripe a block belongs. As the second part of the straddling logical page has been placed into the same page stripe (and different block and channel) upon writing, the controller knows exactly which physical page from that block the non-volatile memory controller must read. Also, the second part of the straddling logical page will always be at the beginning of the data section of the physical page; hence, the data can be easily extracted from the physical page.

Besides this metadata, the non-volatile memory controller also has a bit in the LPT entry that indicates whether a logical page straddles. In case the accessed logical page straddles, the non-volatile memory controller issues in parallel two reads over two memory channels—the first read goes to the original physical block and the second read goes to the second (straddling) physical block. When the reads complete, the non-volatile memory controller extracts the two parts of the logical page, transfers the two parts of the logical page to DRAM, coalesces the two parts of the logical page, and returns the logical page to the user.

Note that straddling across blocks may or may not be used depending on the amount of space actually left in a physical page. It might not be worthwhile performing a straddled write operation if only very little space is left in the physical page where the first part of the straddled logical page would be placed. Also note that depending on the implementation parity information may be placed in block 16 840 or may be placed in any of the blocks 810-840 in a stripe or may even rotate among blocks 810-840 from physical page stripe to physical page stripe.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
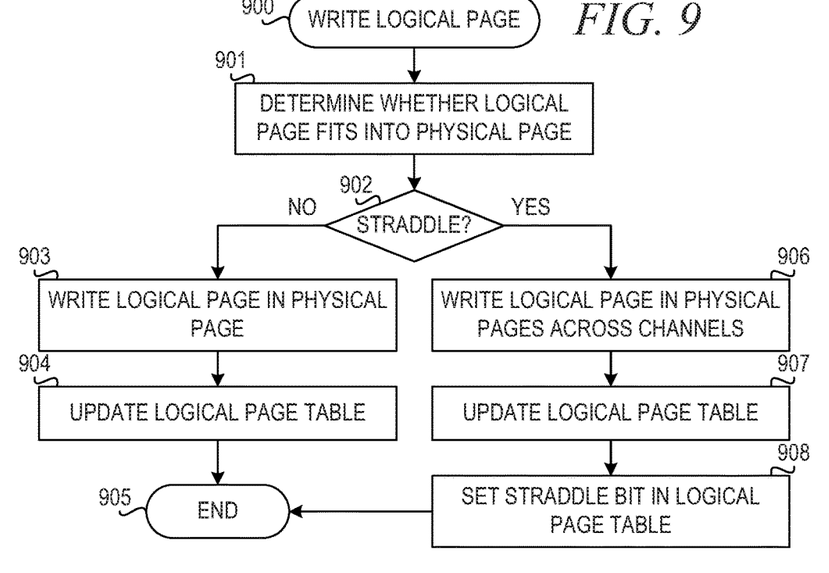
FIG. 9 is a flowchart illustrating operation of a non-volatile memory controller writing a logical page to a non-volatile memory array in accordance with an illustrative embodiment.

FIG. 9 is a flowchart illustrating operation of a non-volatile memory controller writing a logical page to a non-volatile memory array in accordance with an illustrative embodiment. Operation begins with a request to write a logical page to a non-volatile memory array (block 900). The non-volatile memory controller determines whether the logical page fits into the current physical page being written to sequentially (block 901). If the non-volatile memory controller determines that the logical page fits into the current physical page (no straddling) in block 902, then the non-volatile memory controller writes the logical page in the physical page (block 903). The non-volatile memory controller then updates logical page table (block 904). Thereafter, operation ends (block 905).

If the non-volatile memory controller determines that the logical page does not fit into the current physical page (straddling) in block 902, then the non-volatile memory controller writes the logical page in physical pages across channels (block 906). The controller then updates the logical page table (block 907) and sets the straddle bit in a respective entry of the logical page table (block 908). Thereafter, operation ends (block 905).

Figure 10:
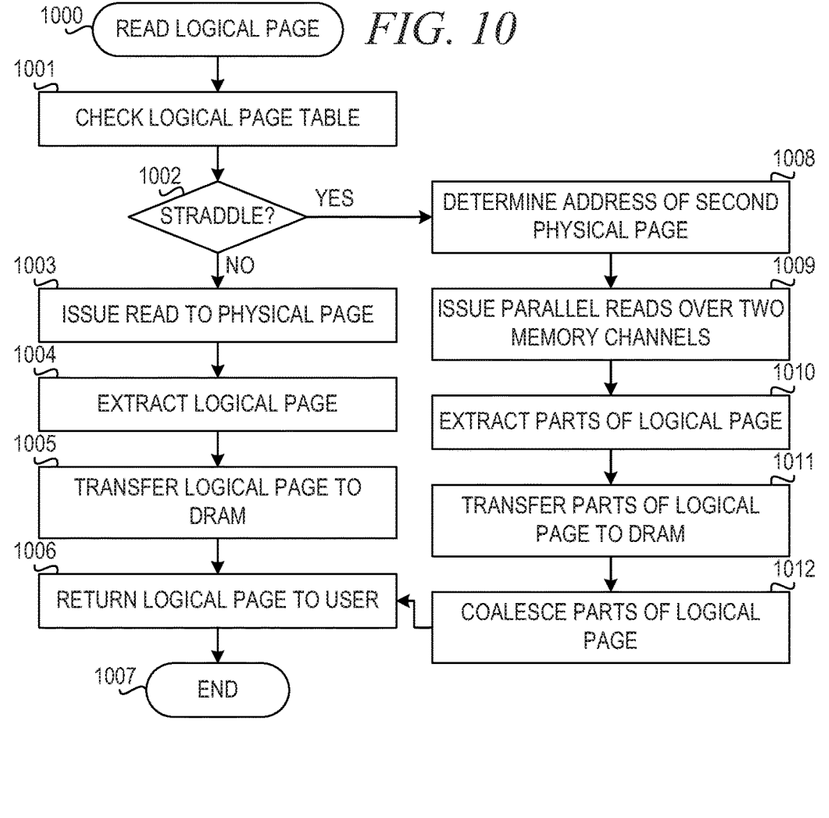
FIG. 10 is a flowchart illustrating operation of a non-volatile memory controller reading a logical page from a non-volatile memory array in accordance with an illustrative embodiment.

FIG. 10 is a flowchart illustrating operation of a non-volatile memory controller reading a logical page from a non-volatile memory array in accordance with an illustrative embodiment. Operation begins with a request to read a logical page from a non-volatile memory array (block 1000). The non-volatile memory controller checks the logical page table (block 1001) and determines whether the logical page straddles memory channels (block 1002). If the logical page does not straddle channels, then the non-volatile memory controller issues a read to the non-volatile memory array to read a physical page to read the logical page (block 1003). The non-volatile memory controller extracts the logical page from the physical page (block 1004), transfers the logical page to dynamic random access memory (DRAM) (block 1005), and returns the logical page to the user (block 1006). Thereafter, operation ends (block 1007).

If the non-volatile memory controller determines the logical page straddles channels in block 1002, the non-volatile memory controller determines the physical address of the second page (block 1108) and issues parallel reads over two channels to read physical pages in the same physical page stripe (block 1109). The non-volatile memory controller extracts parts of the logical page from the physical pages in the physical page stripe (block 1010), transfers the parts of the logical page to DRAM (block 1011), and coalesces the parts of the logical page to form the logical page (block 1012). Then, the non-volatile memory controller returns the logical page to the user (block 1006), and operation ends (block 1007).

Figure 11:
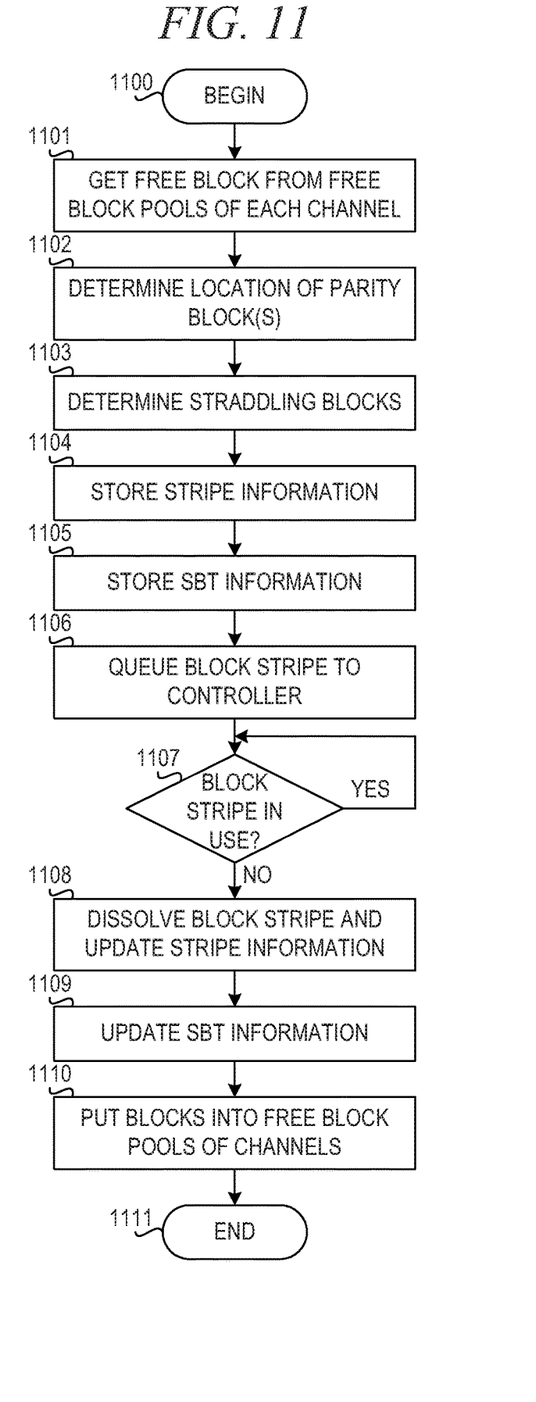
FIG. 11 illustrates a flow chart illustrating operation of a mechanism for managing a block stripe in a non-volatile memory card in accordance with an illustrative embodiment.

FIG. 11 illustrates a flow chart illustrating operation of a mechanism for managing a block stripe in a non-volatile memory card in accordance with an illustrative embodiment. Operation begins (block 1100), and the mechanism gets an erased block from the free block pools of each channel (block 1101). The mechanism then determines one or more blocks that will be used to store parity information (block 1102). Next, the mechanism determines for each data block the corresponding straddling data block in this stripe (block 1103), stores the new stripe information in GPP memory (block 1104), and further stores the new SBT information for each of the data blocks in the stripe in the SBT (block 1105). The GPP queues the block stripe for data placement to the non-volatile memory controller, which will then use the stripe to store data from write operations being processed (block 1106). Thereafter, the mechanism determines whether or not the stripe is still in use (block 1107). A block stripe is no longer in use once the garbage collection process completed relocation of all still valid logical pages to new locations and the erasure of all blocks in the stripe. In response to the operation determining at block 1107 that the block is no longer used, the block stripe can be dissolved by updating the stripe information in GPP memory (block 1108) and updating the mappings of the blocks that belonged to the block stripe in the SBT (block 1109). Finally operation returns the blocks into their corresponding free block pools of each channel (block 1110), and operation ends (block 1111).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a non-volatile memory controller, for reducing read access latency by straddling pages across non-volatile memory channels, the method comprising:
responsive to a request to write a logical page to a non-volatile memory array, determining whether the logical page fits into a current physical page;
responsive to determining the logical page does not fit into the current physical page, writing a first portion of the logical page to a first physical page in a first block and writing a second portion of the logical page to a second physical page in a second block, wherein the first physical page and the second physical page are on different non-volatile memory channels; and
responsive to receiving from a user a request to read the logical page from the non-volatile memory array and responsive to determining that the logical page straddles non-volatile memory channels, issuing parallel reads over two non-volatile memory channels to read the first physical page and the second physical page, wherein issuing parallel reads over two non-volatile memory channels comprises consulting an additional table to obtain a location of the second physical page and reading from a physical page stripe in which the first physical page and the second physical page are stored.

2. The method of claim 1, wherein the first physical page and the second physical page are in a same physical page stripe.

3. The method of claim 1, further comprising:
responsive to determining the logical page does not fit into the current physical page and writing the first portion of the logical page to the first physical page and writing the second portion of the logical page to the second physical page, setting a straddle bit in a logical page table entry corresponding to the logical page.

4. The method of claim 1, further comprising:
responsive to reading the first physical page and the second physical page, extracting the first portion of the logical page from the first physical page and the second portion of the logical page from the second physical page, coalescing the first portion of the logical page and the second portion of the logical page to form the logical page, and returning the logical page to the user.

5. The method of claim 1, further comprising:
checking an entry in a logical page table to determine whether a straddle bit is set for the logical page; and
determining that the logical page straddles non-volatile memory channels responsive to the straddle bit being set for the logical page.

6. A computer program product comprising a computer readable storage medium having a computer readable program stored therein, wherein the computer readable program, when executed on a non-volatile memory controller, causes the non-volatile memory controller to:
responsive to a request to write a logical page to a non-volatile memory array, determine whether the logical page fits into a current physical page;
responsive to determining the logical page does not fit into the current physical page, write a first portion of the logical page to a first physical page in a first block and write a second portion of the logical page to a second physical page in a second block, wherein the first physical page and the second physical page are on different non-volatile memory channels; and
responsive to receiving from a user a request to read the logical page from the non-volatile memory array and responsive to determining that the logical page straddles non-volatile memory channels, issue parallel reads over two non-volatile memory channels to read the first physical page and the second physical page, wherein issuing parallel reads over two non-volatile memory channels comprises consulting an additional table to obtain a location of the second physical page and reading from a physical page stripe in which the first physical page and the second physical page are stored.

7. The computer program product of claim 6, wherein the first physical page and the second physical page are in a same physical page stripe.

8. The computer program product of claim 6, wherein the computer readable program further causes the non-volatile memory controller to:
responsive to determining the logical page does not fit into the current physical page and writing the first portion of the logical page to the first physical page and writing the second portion of the logical page to the second physical page, set a straddle bit in a logical page table entry corresponding to the logical page.

9. The computer program product of claim 6, wherein the computer readable program further causes the non-volatile memory controller to:
responsive to reading the first physical page and the second physical page, extract the first portion of the logical page from the first physical page and the second portion of the logical page from the second physical page, coalesce the first portion of the logical page and the second portion of the logical page to form the logical page, and return the logical page to the user.

10. The computer program product of claim 6, wherein the computer readable program further causes the non-volatile memory controller to:
check an entry in a logical page table to determine whether a straddle bit is set for the logical page; and
determine that the logical page straddles non-volatile memory channels responsive to the straddle bit being set for the logical page.

11. A storage device comprising:
a non-volatile memory array;
a non-volatile memory controller; and
a memory coupled to the non-volatile memory controller, wherein the memory comprises instructions which, when executed by the non-volatile memory controller, cause the non-volatile memory controller to:
responsive to a request to write a logical page to a non-volatile memory array, determine whether the logical page fits into a current physical page;
responsive to determining the logical page does not fit into the current physical page, write a first portion of the logical page to a first physical page in a first block and write a second portion of the logical page to a second physical page in a second block, wherein the first physical page and the second physical page are on different non-volatile memory channels; and
responsive to receiving from a user a request to read the logical page from the non-volatile memory array and responsive to determining that the logical page straddles non-volatile memory channels, issue parallel reads over two non-volatile memory channels to read the first physical page and the second physical page, wherein issuing parallel reads over two non-volatile memory channels comprises consulting an additional table to obtain a location of the second physical page and reading from a physical page stripe in which the first physical page and the second physical page are stored.

12. The storage device of claim 11, wherein the first physical page and the second physical page are in a same physical page stripe.

13. The storage device of claim 11, wherein the instructions further cause the non-volatile memory controller to:
responsive to determining the logical page does not fit into the current physical page and writing the first portion of the logical page to the first physical page and writing the second portion of the logical page to the second physical page, set a straddle bit in a logical page table entry corresponding to the logical page.

14. The storage device of claim 11, wherein the instructions further cause the non-volatile memory controller to:
responsive to reading the first physical page and the second physical page, extract the first portion of the logical page from the first physical page and the second portion of the logical page from the second physical page, coalesce the first portion of the logical page and the second portion of the logical page to form the logical page, and return the logical page to the user.

15. The storage device of claim 11, wherein the instructions further cause the non-volatile memory controller to:
check an entry in a logical page table to determine whether a straddle bit is set for the logical page; and
determine that the logical page straddles non-volatile memory channels responsive to the straddle bit being set for the logical page.

* * * * *